Dec. 30, 1969   W. A. WISEMAN   3,486,861
DETECTION SYSTEMS

Filed Sept. 20, 1967   6 Sheets-Sheet 3

Inventor:
William Antony Wiseman
by George S. Ouzzolli
Attorney

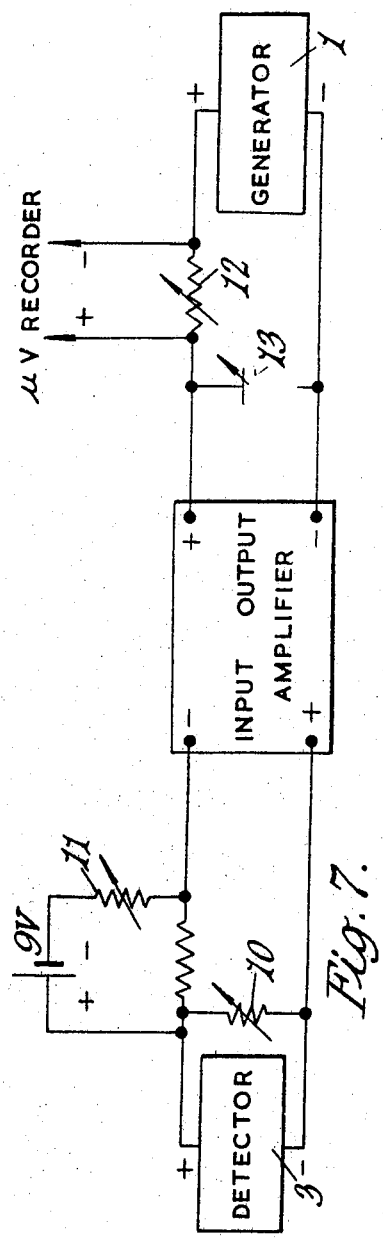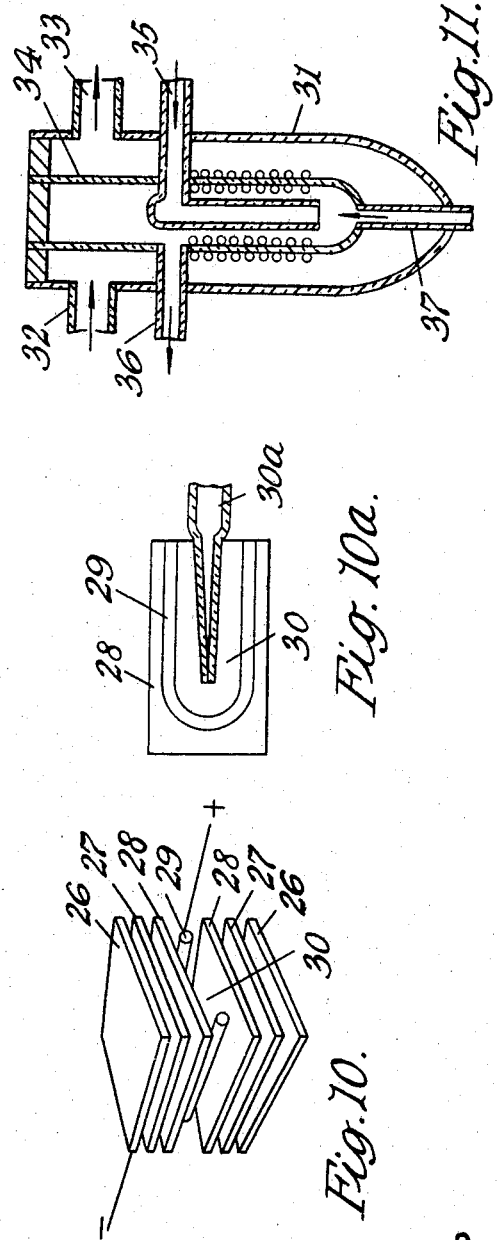

United States Patent Office 3,486,861
Patented Dec. 30, 1969

3,486,861
DETECTION SYSTEMS
William Antony Wiseman, The Mill House,
Bray, Berkshire, England
Continuation-in-part of application Ser. No. 462,678,
June 9, 1965. This application Sept. 20, 1967, Ser.
No. 669,007
Claims priority, application Great Britain, June 18, 1964,
25,273/64; Sept. 21, 1966, 42,063/66, 42,065/66
Int. Cl. G01n 27/62, 29/02, 33/22
U.S. Cl. 23—232
17 Claims

ABSTRACT OF THE DISCLOSURE

A continuous method of detecting or measuring a component of a gas stream, which comprises: incorporating into the gas stream in response to a controlling signal a gas reactive with the component to be detected or measured, allowing the component of the mixture to react with the incorporated gas; detecting the presence, or the amount, of incorporated gas after reaction; using a signal so obtained for the controlling of the incorporation of gas into the gas stream to maintain the level of incorporated gas at the detector, and detecting or measuring work done in the incorporation of gas, respectively as an indication of the presence of, or a measure of the amount of, the component to be detected.

This invention relates to the detection of a component in a gas stream, especially in the gas stream flowing from gas chromatography equipment and is a continuation-in-part of my application Ser. No. 462,678, filed June 9, 1965, now abandoned.

There are a number of detectors used for such purposes none of which can be described as ideal. Any new detector should, among, other things, be linear; have a wide dynamic range (that is, should respond to a wide range of concentration of substance to be detected); lend itself to automatic recording; and have a universal and predictable response, and so on.

The present invention consists in a continuous method of detecting or measuring a component of a gas stream which comprises incorporating a predetermined proportion of a gas reactive with the component to be detected or measured into the gas stream; allowing the component of the mixture to react with the incorporated gas; detecting the presence or the amount of incorporated gas after reaction; using a signal so obtained to control the incorporation of a compensatory amount of the gas reactive with the cmponent to be measured, and feeding the compensatory amount of gas into the detector; and detecting or measuring work done in the incorporation of the compensatory amount of gas.

The present invention in a preferred form consists in a continuous method of detecting or measuring a component of a gas stream, which comprises: incorporating into the gas stream in response to a controlling signal a gas reactive with the component to be detected or measured allowing the component of the mixture to react with the incorporated gas; detecting the presence, or the amount, of incorporated gas after reaction; using a signal so obtained for the controlling of the incorporation of gas into the gas stream to maintain the level of incorporated gas at the detector; and detecting or measuring work done in the incorporation of gas, respectively as an indication of the presence of, or a measure of the amount of, the component to be detected.

It is clear therefore, that one essential difference between the two forms of the invention described above is that in the first mentioned the incorporated gas may pass directly into the detector while in the second it passes into the reactor.

In a preferred embodiment of the invention the incorporated gas is generated in response to the controlling signal for incorporation into the gas stream. The invention will be particularly described with reference to a system using a generated gas which is reactive with the component to be detected or measured.

In the most usual method of operating this system a signal given by the remaining generated gas after reaction is detected and compared with the signal given by a set level of generated gas, and the generation of gas is controlled in a direction to re-establish this predetermined level.

It will be appreciated that the reactor and detector may be combined in the same piece of equipment, that is to say, that some form of combustion chamber (for example) may be provided which also provides a signal as the oxygen concentration changes. Such a combination is described in more detail with reference to the drawings.

The invention provides a system which is inherently linear because of its 100% feed-back characteristic. The actual detection may be non-linear with regard to the generated material, but this is not important; the whole system is linear.

The usefulness of the system is limited by the availability and nature of a suitable generant or working substance, generator or detector. The detector must be specific for the working substance and to be really useful the reaction between the working substance and compounds to be detected must be quantitative, rapid and predictable. Oxygen is one example of a suitable working substance: there are a number of well-known specific detectors for oxygen; to mention some—there is first the so-called Hersch cell. This is an electro-chemical device, fully described in British Patent No. 913,473, and similar devices are described in British Patents 707,323 and 750,254. In this case the oxygen is absorbed from the gas phase and converted either stoichiometrically, or non-stoichiometrically, into ions; the construction of the cell itself ensures that it is specific for oxygen. Another type of system which is specific to oxygen is one using a so-called solid electrolyte—zirconia (zirconium oxide) is a typical solid electrolyte. Zirconia is ordinarily porous but it can be made non-porous and suitable for use as a specific oxygen detector by the incorporation of small quantities of lime or magnesia; such mixture is known as lime- or magnesia-stabilised zirconia, and can be frabricated into tubes, etc. If a platinum electrode is put on the inside of the tube and another on the outside of the tube, and there is a difference in oxygen concentration in the gas phase inside and outside, a predictable potential will arise between the two platinum electrodes.

A third method of detecting oxygen specifically is to make use of its paramagnetic properties. Several devices using these properties have been developed over the course of time and workers in the field are familiar with them.

Other working substances can be thought of, for instance, hydrogen: hydrogen can also be detected in a suitable electro-chemical cell. A great deal of research has been carried out to devise systems which are specific for hydrogen and which are used in fuel cells. These can be used as specific detectors for hydrogen in this invention. Electro-chemical cells have been made specific for a number of other gases—to mention a few, we would suggest chlorine, nitrogen peroxide, nitric oxide and so on. The invention is, therefore, not seriously limited by lack of suitable working subtances. All these substances have numerous rapid predictable (even if catalysed) reactions with many substances and by suitable choice of working substance the detecting system can be made specific for a given substance or group of substances, or sensitive to a whole range of compounds, and in particular case of catalysed reactions of oxygen to practically every organic compound, and dozens of others.

Many of these substances can be generated electrolytically and in this respect would be suitable working substances for use with this invention. There is enormous scope for ingenuity in the operation of this invention, and the lack of suitable working substance is not a limiting factor. However, this invention will be basically illustrated in a practical form by particular reference to oxygen as a reactant, an electrolytic generator generating oxygen as a generator and the Hersch cell as a detector. This substance is chosen for its wide application. However, in all the following description the general comments apply equally to systems with other working substances.

The Hersch cell suggested for use here is described in British Patent No. 913,473. It is possible to operate this cell stoichiometrically at low flow rates, and nonstoichiometrically, for instance, at high flow rates when the response of the cell is independent of gas flow. Both these methods of use are equally useful for the operation of this invention.

In the former mode if the effluent from the gas chromatography column (for example) is absolutely free from organic matter then the current required to generate the oxygen in the generator will exactly equal the current given by the Hersch cell. As soon as an organic compound appears, the level of the oxygen in the detector will fall and hence its output will fall and the generator and the detector will no longer be in balance. More oxygen will be generated in exactly the correct amount to account for the organic material burnt in the reactor. The current used to do this represents the signal from the detecting system and can be shown both differentially, i.e. as current, or integrally, i.e. as charge. There is absolutely no difficulty in measuring either of these quantities. A typical method of doing so would be by means of an ammeter or recording ammeter or potentiometer and/or by a Kent current integrator. Another method of measuring integrally would be to charge a condenser and measure the charge on it. In this way both differential and integral traces for a chromatogram are easily obtained. The differential reading is a measure of concentration, and the integral reading of total quantity.

Chromatography is a most important use for the new method of detection now provided, but the invention would in essence work with any gas stream.

There is no need for the detector to work linearly, stoichiometrically or in accordance with any simple physical phenomenon—it is only necessary to adjust the gain of the feed-back loop to a sufficiently high quantity and the correct amount of oxygen will be generated. If the gain of the loop is too high oscillation can set in, but this can be considerably reduced by decreasing the time constant of the system, by critically adjusting the gain of the feed-back loop, and/or by suitable damping. A further convenient method of minimising oscillation is to make the signal fed back to the generator proportional to the first integral of the current given by the detector. In any case, a small amount of oscillation may not necessarily be undesirable as it ensures quantitative results.

There are many further alternative methods of operating the invention. Thus, a small quantity of oxygen may be present, in or introduced to the carrier gas of the gas chromatography system prior to and independently of the generator. In this case, the generator need not operate until some organic material has appeared in the reactor (i.e. the oxygen signal is reduced). This will stimulate the generator to generate some oxygen which will replace that used up, and hence will give the correct response.

The apparatus which embodies this method may be readily made up, and itself constitutes another aspect of this invention. Such apparatus may comprise a gas generator for a reactive gas, a reaction zone, and a detector for unused reactive gas, arranged in series for a gas flow system; an electrical feed-back circuit for conveying the signal from the detector to the gas generator; and means to measure or detect work done by the generator. Of course, the apparatus may be provided as a standard detection equipment in combination with a gas chromatography column.

The invention will be more fully described with reference to the accompanying drawings which illustrate diagrammatically the general layout for this type of detector.

In the accompanying drawings:

FIGURE 7 shows how the controls on such an amplifier can be used to control various parts of the equipment.

FIGURES 10 and 10a show a modified oxygen detector valuable for use with the equipment.

FIGURE 11 shows a yet further form of an oxygen detector which may be used.

Figure 1:
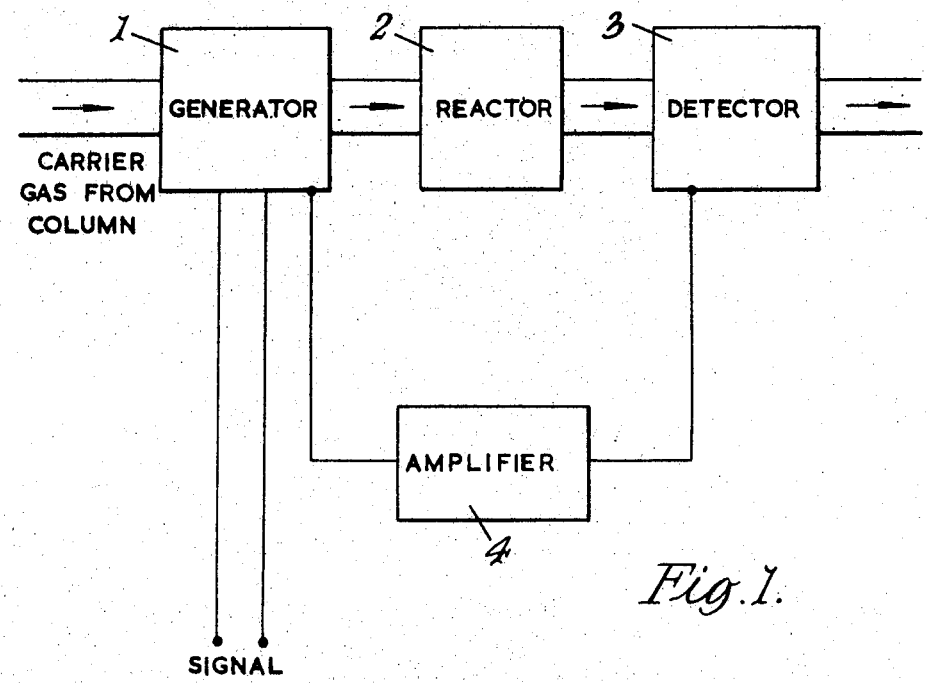
FIGURE 1 shows as a block diagram a basic layout for the system.

Referring to FIGURE 1 the effluent from a gas chromatography column (not shown) or the gas stream containing detectable material is passed in the direction of the arrow through a generator 1. The effluent plus the material from the generator 1 is fed into a reactor 2, which removes from the effluent the compounds which it is desired to detect by reaction with the material from the generator 1. From the reactor 2 the effluent from the column goes into a detector 3.

The detector 3 is so arranged that it is coupled with the generator 1 by a suitable amplifier and servo-system 4. The detector 3 is set to a definite level of material from the generator and the amplifier and servo-mechanism 4 are connected in such a way that should the level of the material in the detector 3 fall it will send back a signal to the generator 1 to generate more material to restore the signal in the generator to the original level. The work in doing this is recorded and represents the signal from the system.

Figure 2:
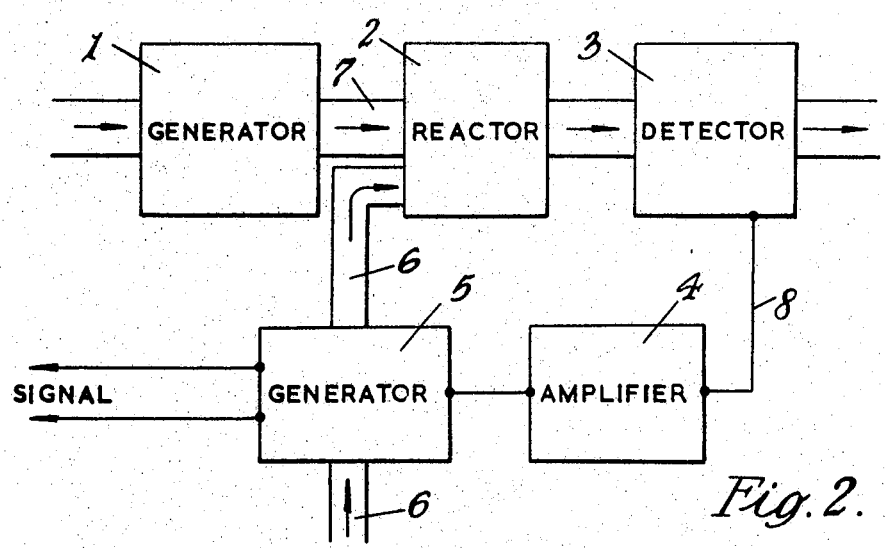
FIGURES 2, 3, 4 and 5 show other possible assemblies, also in block diagram form.

In FIGURE 2 there are two generators. Generator 1 provides the gas stream with a small but constant supply of oxygen (for instance); this normally flows into the reactor 2 without change, and is detected by the detector 3. A second gas stream flows through the generator 5 in duct 6 and this is fed directly into the reactor at just about the point where the gas stream from generator 1 is fed in. In this way, as soon as the concentration of (say) oxygen in the detector 3 falls, then a signal is fed back through amplifier 4 to generator 5, which generates oxygen to replace the deficit. There are, therefore, two generators—one of which (number 1) ensures a constant supply of gas and the other (number 5) a variable supply. The signal being measured will of course be derived from generator 5.

Generator 1 can be in a number of positions in a gas chromatography set-up. It can, for instance, be placed before or after the gas chromatography column.

In a modification, readily understood from the drawings and hence not shown separately it can be dispensed with altogether and the oxygen normally present in some cylinder gases as an impurity will be sufficient to initiate reaction in the reactor. In a still further modification gases can be supplied in bottles specially for use with detector 3 and already containing a small proportion of oxygen.

It should be pointed out that the generator 5 will be operating the whole time, assuming that the inert gas which is being fed through it via duct 6 contains less oxygen than the main stream in duct 7. Generator 5 will automatically (by means of the feed-back loop) ensure that in static conditions the gas stream 6 contains the same proportion of oxygen as the gas stream 7.

Figure 3:
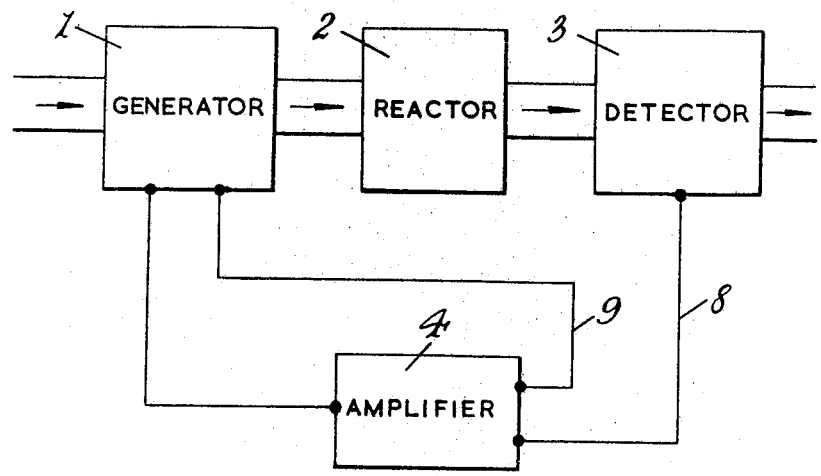

A further modification of the basic assembly of FIGURE 1 is shown in FIGURE 3. Here, the signal conveyed to the generator 1 is related to the signal given by the generator, through the feed-back loops 8 and 9 shown. For theoretical reasons, it appears that this minimises oscillation.

Figure 4:
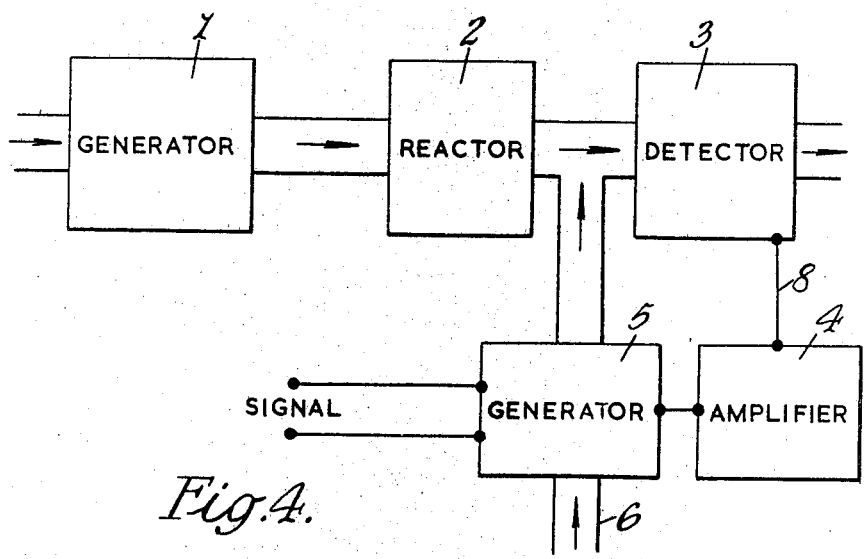
Figure 5:
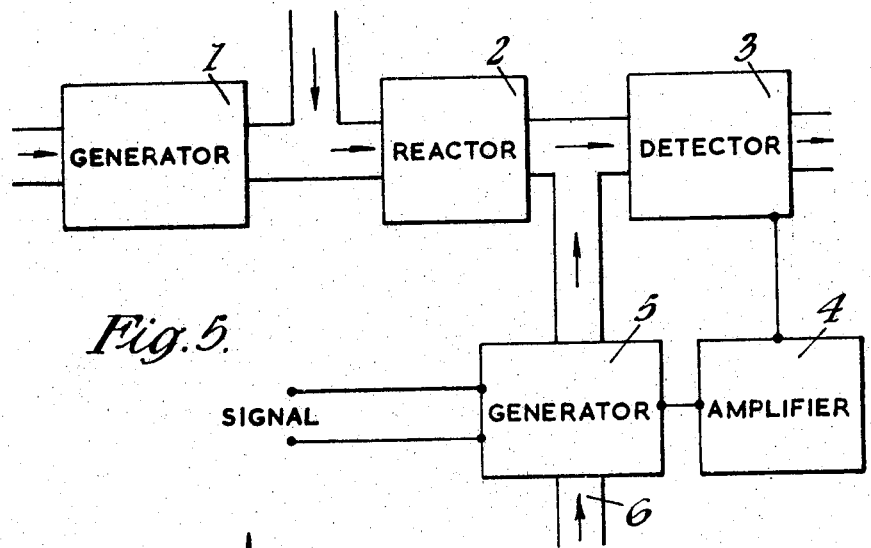

A still further modification is shown in FIGURE 4, where the references have the same significance as in FIGURE 2. In this, the compensatory flow of gas from generator 5 passes into the system after the reactor but before the detector. It is clear that the system will operate in the same way as described above in relation to FIGURE 2. FIGURE 5 shows a variant of the system shown in FIGURE 4 wherein the sample or carrier gas enters at duct 1a just after the generator 1. The other parts of the system are essentially as FIGURE 4. It will be appreciated that, in FIGURES 4 and 5 as in FIGURE 2, either a steady level of impurity oxygen or a known steady incorporation of oxygen, other than generator 1, may be used.

Figure 6:
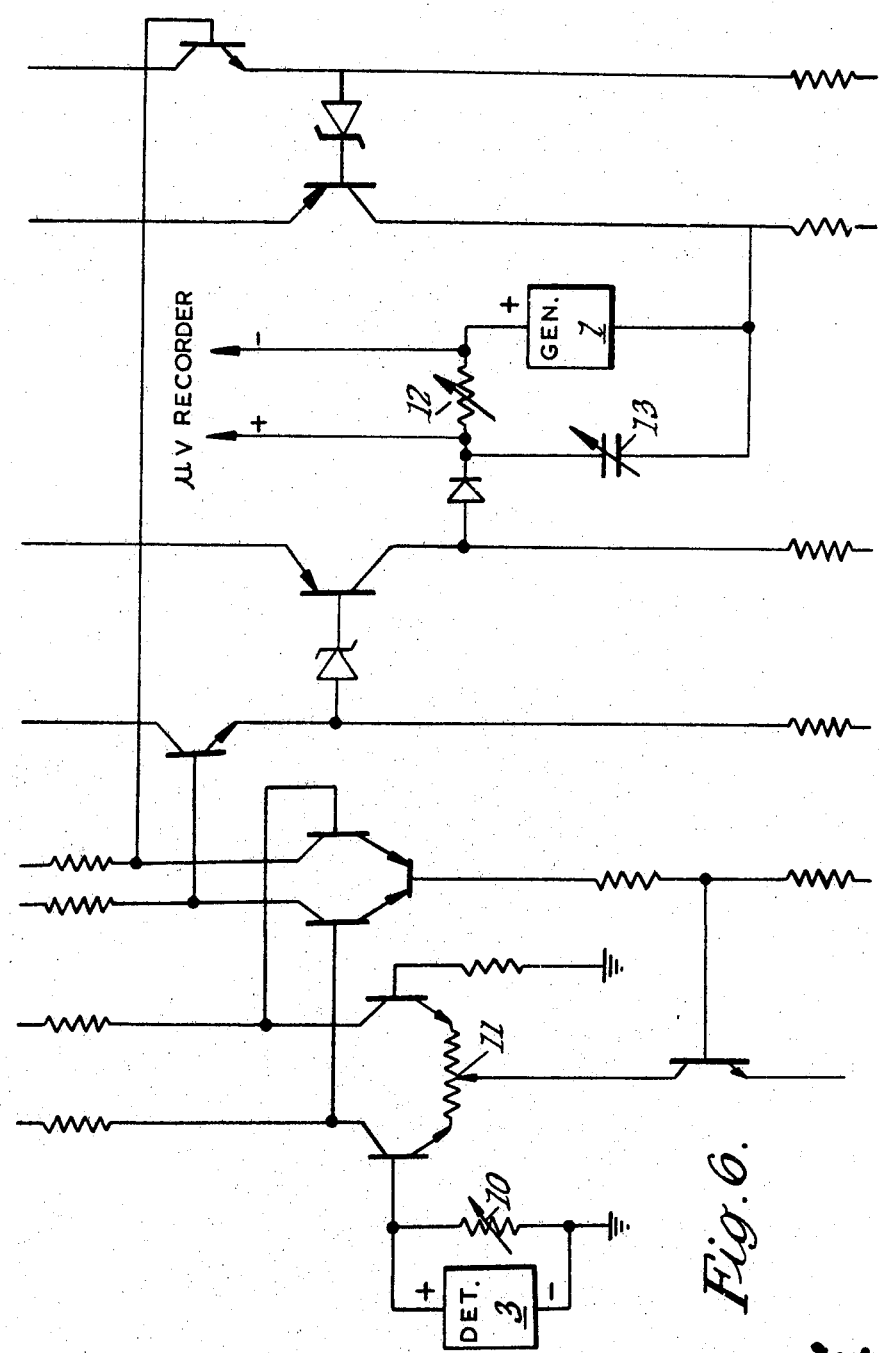
FIGURE 6 shows an electrical circuit diagram of a typical assembly as shown in FIGURE 1.

FIGURE 6 shows an electrical circuit diagram of the assembly as shown in FIGURE 1. The major part of this is a conventional amplifier circuit. As far as the controls 10, 11, 12 and 13 are concerned, these will be best understood with reference to FIGURE 7, from which it will be seen that variable resistor 10 adjusts detector load resistance, 11 adjusts the standing generator current, 12 adjusts the recorder sensitivity and 13 adjusts the amplifier response time. The amplifier used is in fact the conventional Kent amplifier.

To turn now to a consideration of the construction of the cells or detectors which may be used, although the broad scope of the invention is not to be limited to any one type, they should preferably all be of small size, be fairly robust, capable of being incorporated as part of a gas-flow system and above all have a quick response and be free from signal noise.

Figure 8:
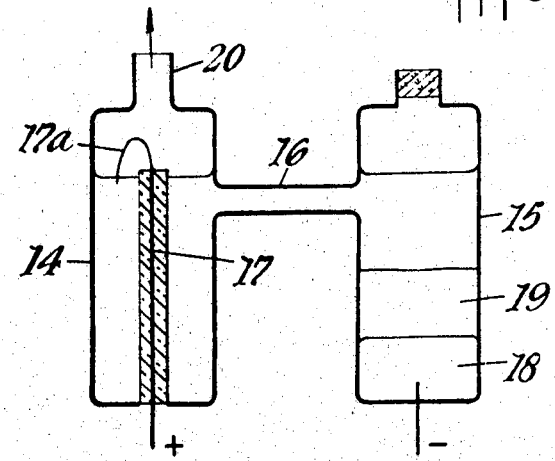
FIGURE 8 shows a typical oxygen generator as used in the equipment.

One commonly met with form of oxygen generating cell is shown in FIGURE 8. This has two limbs, 14 and 15 connected by a bridge of electrolyte 16. The anode 17 at which oxygen is generated is a very fine platinum wire glass coated over most of its length, for mechanical strength, but bending over at 17a into the electrolyte. (0.001 inch diameter wire has been used; the finer the wire, the smaller the bubbles formed, the less fluctuation in resistance thereby engendered, and the less the noise). The cathode 18 is essentially a pool of mercury, but this is covered by a layer of depolarizer 19 (a $HgSO_4$/carbon mixture) so that effectively no hydrogen is produced, and the limb 15 can be sealed. The electrolyte is sulphuric acid (6 N). In use oxygen is given off at 20.

Figure 9:
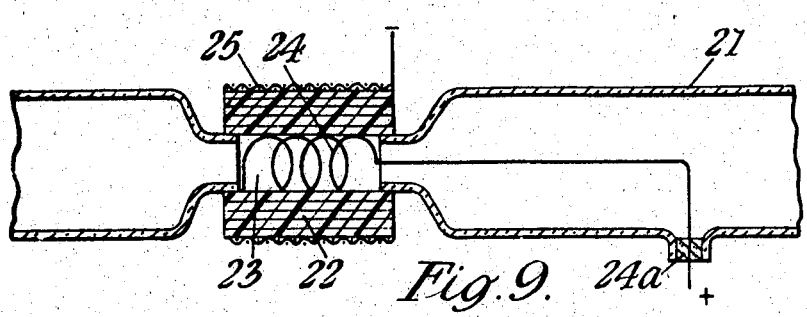
FIGURE 9 shows a further oxygen generator, which may also be used as an oxygen detector.

A more sophisticated form of oxygen generator is shown in FIGURE 9. This is situated in a gas-flow channel 21, and consists of a tight roll of porous polyvinyl chloride sheet 22 (for example that known under the name "Porvic") having a central axial hole 23 wherein a coil of 35 gauge platinum wire 24 wound into a coil of 0.8 mm. inside diameter and about 0.5 mm. pitch. Around the outside of the roll of p.v.c. is wrapped a silver gauze 25. In use the roll 23 of porous polyvinyl chloride is impregnated with electrolyte, which once again may be 6 N sulphuric acid, but care must be taken to ensure that no liquid electrolyte remains on its surface. That is to say, all the electrolyte must be held within the pores of the roll 23 of polyvinyl chloride. In this way, with the silver gauze 25 as cathode and the platinum coil 24 as anode, oxygen is evolved and molecular oxygen is swept into the gas stream without formation of bubbles, giving a very rapid and noise-free response.

The reference 24a shows a seal by which the anode wire may be led out of the generator. If desired, the whole generator may be coated with a depolariser to avoid external formation of hydrogen.

Of course, such a generator may readily be used in reverse as a specific oxygen detector.

Two constructions more especially suited to oxygen detection will, however, now be described in some detail.

One such construction is shown in FIGURE 10, in an exploded isometric projection, with a view of the middle portion shown in FIGURE 10a. It consists essentially of a 7-layer sandwich construction, the layers of which are all in close contact with one another and which consist of a sheet of nickel 26, a sheet of porous polyvinyl chloride 27, a sheet of porous silver 28, a horseshoe of silver wire (18 gauge) 29, and thereafter the porous silver 28, porous polyvinyl chloride 27 and nickel 26. The arrangement of the silver wire 29 is shown in FIGURE 8a, as is a fine tube 30 through which the gas stream containing the oxygen to be detected is fed into the space 31 within the horseshoe. It will be appreciated that the pores of the porous components are filled with electrolyte (25% potassium hydroxide) but that no bulk liquid electrolyte is present in contact with the wire 29.

In FIGURE 10 it will be seen that particular attention has been paid to the dimensions of that part of the cell where oxygen is absorbed; in this way the dead volume of the detector and similarly the time constant is kept to the minimum. This type of Hersch cell is designed basically on the principles outlined in British Patent No. 913,473, but its construction is not limited to a cell designed in this way, and could be used for a cell designed in accordance with British Patent No. 750,254, and similar oxygen sensitive systems.

Another such construction is shown in FIGURE 11. This uses a solid electrolyte, as described above.

This oxygen detector consists of an outer vessel 31 having an inlet 32 and outlet 33 for pure carrier gas. A static reference $O_2$ supply is perfectly feasible and even air may be suitable. Within this vessel 31 there is a hollow tube of solid electrolyte 34, and an inlet 35 for the gas flow with sample, and outlet 36, communicates with the inside of this tube. Also leading into the hollow tube 34 of solid electrolyte is inlet 37 for the oxygen gas being provided by the generator, as generator 1 in FIGURE 1, electrically connected to the detector by a feed-back amplifier.

The inlet 35 leads to an innermost silica tube 38. 39 and 40 are two heated platinum coils at either side of, and in contact with the walls of tube 34. These coils conveniently held at about 800° C. record the potential difference between the inside and the outside of the solid electrolyte tube 34.

It will be appreciated that such a device will function as both a device for oxygen detection, and as a catalytic reaction chamber, as outlined above.

These solid electrolyte detectors do not work at temperatures much below 600° C., and continue to function satisfactorily to about 1,000° C., a good temperature for the catalytic oxidation of hydrocarbon is about 800–900° C., so the whole device is very compact. There are, of course, other methods of arranging the gas flows, but this is one of the best.

All these systems are potentially capable of extreme sensitivity—in the first place, the detection system and the generating system have inherent noise values of molecular order, in the same way as, say, a dry battery, or lead accumulator if properly constructed. On the other hand, owing to the large level of Faraday's constant and the fact that each organic molecule usually requires more than ten and up to 1,000 equivalents of oxygen to combust, there is a leverage of sensitivity of this order. By way of illustration, if there is present in the carrier gas stream 1 v.p.m. of benzene vapour, and the carrier gas flow is 100 ml. per minute, the stoichiometric current given should be 0.84 ma.; 1 microgramme of benzene should give stoichiometrically 0.04 coulombs. By way of comparison, the flame ionisation detector, which is the detector currently most widely used in gas chromatography, gives only about $10^{-8}$ coulombs for a microgramme of benzene. These figures have been borne out in practice. Currents of the order of $10^{-12}$ amps. or less can be detected, so the sensitivity of the system is easily seen.

The invention has been particularly described above with reference systems in which the reaction in the reactor is combustion, and only a single reaction is required. However, systems may be used with other reactions fast enough to be used in gas chromatography, and more than one reaction may occur. For example the gas stream may be passed through a preliminary reactor so as to modify one of the components before it is mixed with the generated gas. Alternatively the generated gas may be modified before it is mixed into the gas stream.

One suitable reaction system which may be used comprises the use of hydrogen as the reactive gas in the reduction of olefins over a catalyst. In this case the generator is an electrolytic generator for hydrogen, the reactor includes the hydrogenation catalyst, and the detector is one sensitive to hydrogen. The feedback amplifier would be substantially the same as in a combustion system, possibly having a wider range of gain control to cover the wider range of reaction times. In such cases the amount of hydrogen generated is exactly equivalent to the amount of olefins passing through the reactor.

Another suitable reaction system combines the hydrogenation of olefins with the reduction of alcohols to olefins. In such a system two reactors are required, one for the reduction of alcohols to olefins (for example a column containing phosphoric acid at 300° C.) and another for the hydrogenation of the olefins.

Another suitable reaction system combines the hydrogenation of olefins with the reduction of alcohols to olefins. In such a system two reactors are required, one for the reduction of alcohols to olefins (for example a column containing phosphoric acid at 300° C.) and another for the hydrogenation of the olefins.

Another suitable reaction system is the direct reduction of alcohols to hydrocarbons using Raney nickel catalyst at 170° C. The amount of hydrogen generated is proportional to the amount of alcohols, so this system is quantitative and specific for alcohols.

Another suitable reaction system concerns the detection of amino acids; this system includes a first reactor for the conversion of the amino acids to aldehydes in a reactor (suitably a ninhydrin containing column) and a second reactor for the reduction of the aldehydes (suitably using Raney nickel and hydrogen). In this system, the amount of amino acids is proportional to the hydrogen generated.

Another suitable reaction system concerns the determination of nitrogen in organic compounds. Using hydrogen as the reactive gas and a catalyst such as nickel on quartz wool or nickel on magnesium oxide at a temperature of 400° C., the nitrogen is converted to ammonia, which is detected, and the amount of hydrogen generated is a measure of the amount of nitrogen containing compound present.

Figure 12:
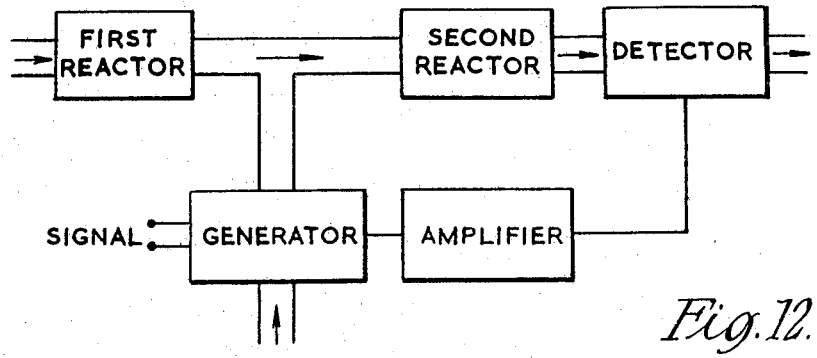

According to FIGURE 12, the system includes two reactors. The gas stream passes into the first reactor where the first reaction not involving a reactive gas takes place (for example the reduction of alcohols to olefins), a secondary gas stream containing the reactive gas passes through the generator and joins the gas stream before entry to the second reactor where the reaction of the component is to be determined with the reactive gas takes place (for example hydrogenation of olefins) and the resulting gas stream passes through the detector which determines the amount of reactive gas. Where this falls below the predetermined amount a signal is passed back through the amplifier to the generator to generate a compensatory amount of the reactive gas. The work done by the generator is a measure of the component to be determined.

Figure 13:
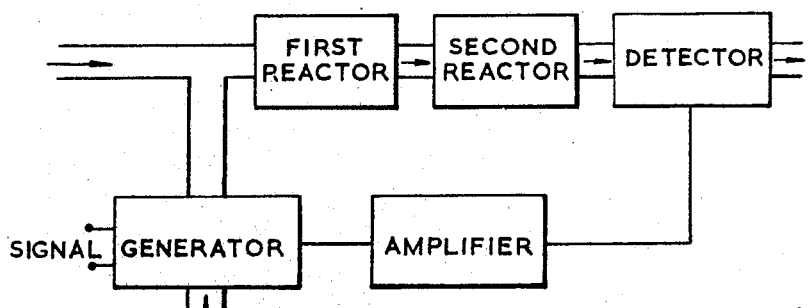

According to FIGURE 13, a system similar to that in FIGURE 12 is shown, except that in this case the reaction in the first reactor involves reaction with the reactive gas generated at the generator. In the second reactor some other reaction is involved.

Figure 14:
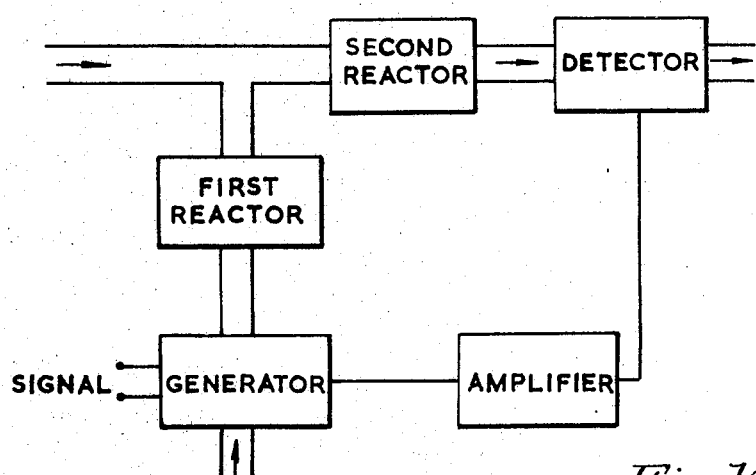

According to FIGURE 14 a system is shown where the reactive gas produced by the generator reacts in a specific way with the compound to be detected in the second reactor. The detector is responsive to the compound which reacts, and the detection signal is fed back as in the other systems.

In the systems such as FIGURES 12, 13 and 14 involving a secondary gas flow, the secondary gas flow is suitably at a fixed rate.

The invention has been described with reference to its preferred embodiment in which gas is generated in response to a controlling signal. In particular the use of electrolytic generators has been described. However, the use of a generator is not essential, and any mechanical arrangement which introduces the appropriate volume of reactive gas into the system in response to an electric signal may equally well be used. The method and apparatus used are as described above except for the replacement of the generator by means for the introduction of the reactive gas.

The means for the introduction of the reactive gas may be any electrically controllable method of introduction, such as for example an electrically operated motoring valve connected with a supply of the reactive gas, suitably under pressure. Alternatively the method of introduction may comprise an electrically operated piston displacement device, for example a piston moving in a tube containing the reactive gas. These methods and devices are of well known type.

The method and apparatus for use in a system using hydrogen as the generated gas are described in detail in "Journal of Gas Chromatography", July 1967 pages 334–340, in the article entitled "A Servo Mechanism Detector for the Quantitative Measurement of Gas-Chromatographic Zones of Hydrogenatable Material."

I claim:

1. A continuous method of detecting or measuring a component of a gas stream, which comprises: incorporating into the gas stream a gas reactive with the component to be detected, allowing the component of the mixture to react with the incorporated gas; detecting the amount of incorporated gas after reaction and generating a control signal which is proportional thereto; using the control signal for the controlling of the incorporation of gas into the gas stream to maintain the level of incorporated gas at the detector, and measuring work done in the incorporation of gas into the gas stream, as a measure of the amount of the component to be detected or measured.

2. A continuous method of detecting or measuring a component of a gas stream which comprises incorporating a predetermined proportion of a gas reactive with the component to be measured into the gas stream; allowing the component of the mixture to react with the incorporated gas; detecting the amount of incorporated gas after reaction and generating a control signal which is proportional thereto; generating a compensatory gas reactive with the component to be measured, controlling the generation of compensatory gas with said control signal, feeding the compensatory amount of gas into the gas stream; and measuring work done in the generation of the compensatory amount of gas.

3. A continuous method of measuring a component of a gas stream, which comprises: generating in response to a control signal a gas reactive with the component to be measured; mixing the generated gas with the gas stream, allowing the component of the mixture to react with the generated gas; detecting the generated gas after reaction and generating a control signal; using said control signal to control the generation of gas; and measuring work done in the generation of gas to thereby give an indication of the amount of the component.

4. A method as claimed in claim 3, in which a predetermined level of gas is introduced, a signal representative of said predetermined level of gas is generated, said control signal is compared with the signal, and the generation of gas is controlled to maintain the predetermined level.

5. A method as claimed in claim 3 in which a predetermined level of gas is incorporated into the gas stream independently of the generated gas.

6. A method as claimed in claim 3 in which a signal from the detector is fed through an amplifier to the generator, and a signal from the generator is fed back to the amplifier, in order to minimize oscillation.

7. A method as claimed in claim 3 wherein the gas stream is passed through a preliminary reactor to modify one of the components thereof before the gas stream is mixed with the generated gas.

8. A method as claimed in claim 3 wherein the reactive gas is hydrogen.

9. A method as claimed in claim 3 in which the generated gas is oxygen and the reaction is combustion or catalytic oxidation.

10. A method as claimed in claim 9 in which the oxygen detector is a solid electrolyte detector.

11. A method as claimed in claim 9, in which the oxygen is generated by an electrolytic cell generating only oxygen.

12. A method as claimed in claim 11, in which the current from the electrolytic cell is measured as an indication of the level of the component.

13. A method as claimed in claim 11, in which the charge from the cell is measured as an indication of the amount of the component passing in the gas stream over any period.

14. A method as claimed in claim 9 in which the oxygen detector is a Hersch cell.

15. A method as claimed in claim 14 in which the Hersch cell is operated under stoichiometric conditions at low flow rates.

16. A method as claimed in claim 14 in which the Hersch cell is operated under non-stoichiometric conditions at high flow rates.

17. Apparatus for detecting or measuring a component of a gas stream comprising: a gas-generator for generating a reactive gas responsive to an electrical signal, a reaction zone, and a detector for reactive gas to generate a control signal proportional to the amount of reactive gas, arranged in series in a gas-flow system; an electrical feedback circuit for conveying the control signal from the detector to the gas-generator; and means for measuring the electrical signal applied to the generator to indicate work done by the generator.

References Cited

UNITED STATES PATENTS

| | | |
|---|---|---|
| 2,734,376 | 2/1956 | Cherry et al. |
| 2,762,568 | 9/1956 | Sullivan. |
| 2,805,191 | 9/1957 | Hersch _____ 23—232 |
| 3,010,801 | 11/1961 | Schulze _____ 23—254 XR |
| 3,096,157 | 7/1963 | Brown et al. _____ 23—254 XR |
| 3,240,554 | 3/1966 | Angerhofer. |
| 3,342,558 | 9/1967 | Reinecke _____ 23—254 XR |

OTHER REFERENCES

Walker et al.: "Principles of Chemical Engineering" (1927), pp. 23–24.

MORRIS O. WOLK, Primary Examiner

R. E. SERWIN, Assistant Examiner

U.S. Cl. X.R.

23—254